(12) United States Patent
Liu

(10) Patent No.: US 11,579,977 B2
(45) Date of Patent: Feb. 14, 2023

(54) DATA STORAGE DEVICE RESTORING METHOD

(71) Applicant: Silicon Motion, Inc., Jhubei (TW)

(72) Inventor: Tsai-Fa Liu, Jhubei (TW)

(73) Assignee: Silicon Motion, Inc., Jhubei (TW)

(*) Notice: Subject to any disclaimer, the term of this patent is extended or adjusted under 35 U.S.C. 154(b) by 242 days.

(21) Appl. No.: 17/031,929

(22) Filed: Sep. 25, 2020

(65) Prior Publication Data

US 2021/0224158 A1 Jul. 22, 2021

(30) Foreign Application Priority Data

Jan. 16, 2020 (TW) .................................. 109101439

(51) Int. Cl.
*G06F 9/44* (2018.01)
*G06F 11/14* (2006.01)
*G06F 3/06* (2006.01)
*G06F 11/36* (2006.01)
*G06F 8/654* (2018.01)
*G06F 9/4401* (2018.01)

(52) U.S. Cl.
CPC ........ *G06F 11/1417* (2013.01); *G06F 3/0625* (2013.01); *G06F 3/0658* (2013.01); *G06F 3/0679* (2013.01); *G06F 8/654* (2018.02); *G06F 9/4401* (2013.01); *G06F 11/362* (2013.01); *G06F 2201/805* (2013.01)

(58) Field of Classification Search
CPC ............... G06F 11/1417; G06F 9/4401; G06F 2201/805; G06F 8/654; G06F 3/0625; G06F 3/0679; G06F 11/362
See application file for complete search history.

(56) References Cited

U.S. PATENT DOCUMENTS

| 6,442,623 | B1 | 8/2002 | Kim | |
|---|---|---|---|---|
| 9,329,931 | B2 | 5/2016 | Canepa et al. | |
| 2003/0233562 | A1* | 12/2003 | Chheda | G06F 12/1466 713/193 |
| 2008/0256525 | A1* | 10/2008 | Ellsworth | G06F 11/1433 717/168 |
| 2017/0315889 | A1* | 11/2017 | Delaney | G06F 1/30 |
| 2019/0034114 | A1* | 1/2019 | Natarajan | G11C 16/3495 |
| 2020/0226026 | A1* | 7/2020 | Wu | G06F 11/362 |
| 2020/0356438 | A1* | 11/2020 | Kim | G06F 3/0679 |
| 2021/0026800 | A1* | 1/2021 | Hahn | G06F 3/0619 |

FOREIGN PATENT DOCUMENTS

TW I567536 B 1/2017

* cited by examiner

*Primary Examiner* — Zahid Choudhury

(57) ABSTRACT

A data storage device restoring method is provided, which is adapted to a data storage device. The data storage device includes an SSD controller, a power management circuit, a non-volatile memory, and a reset circuit. The data storage device restoring method includes: the power management circuit determines whether a normal signal from the SSD controller is received within a predetermined time; if not, the power management circuit resupplies power to the data storage device but stops supplying power to the non-volatile memory, thereby the SSD controller stays in a read-only memory mode to automatically execute the data storage device restoring process.

6 Claims, 4 Drawing Sheets

DATA STORAGE DEVICE RESTORING METHOD

FIELD OF THE INVENTION

The present invention relates to a restoring method, and more particularly to a data storage device restoring method can cause a data storage device to enter into a read-only memory (ROM) mode to automatically execute a restoring process.

BACKGROUND OF THE INVENTION

It will be a trend that solid-state data storage devices (SSD) become the mainstream in the market with the development of technology. This is due to its several advantages, such as fast read and write speeds, strong shock resistance, extremely low power consumption, and so on. However, despite these excellent characteristics of a data storage device, inevitably, it does not boot properly or it is not recognizable in some conditions. For example, a deadlock caused by a firmware damage or a firmware program error can cause a host device to fail to recognize a solid-state data storage device or cause the solid-state data storage device to fail to boot properly. The existing method is taking out the solid-state data storage device and forcing the solid-state data storage device to enter an initial mode through a process on a hardware, reconnecting the solid-state data storage device with the host device, and then debugging or upgrading to achieve the purpose of restoring. However, these actions require an user to take out the solid-state data storage device and send it to a service station to get processed. Therefore, how to provide an action that can restore the solid-state data storage device without disassembling the solid-state data storage device or sending the solid-state data storage device to a service station will be the problem focused in the invention.

SUMMARY OF THE INVENTION

In view of this, an embodiment of the present invention provides a data storage device restoring method adapted to a data storage device. The data storage device includes an SSD controller, a power management circuit, a non-volatile memory, and a reset circuit. The data storage device restoring method comprises the power management circuit determining whether a normal signal from the SSD controller is received within a predetermined time; and if not, the power management circuit resupplying power to the data storage device but stopping supplying power to the non-volatile memory.

In an embodiment of the present invention, after the step of the power management circuit resupplying power to the data storage device but stopping supplying power to the non-volatile memory, the data storage device restoring method further comprises the SSD controller completing an execution of a read-only memory program within a first buffer time but the SSD controller failing to read a boot code within a second buffer time, so that the SSD controller staying in a ROM mode.

In an embodiment of the present invention, the data storage device is coupled to a host device. After the step of the SSD controller staying in the ROM mode, the data storage device restoring method further comprises the SSD controller downloading a debug program from the host device in the ROM mode; the SSD controller executing the debug program to generate an error message; the SSD controller uploading the error message to the host device; and the SSD controller downloading an upgrade program from the host device and executing the upgrade program to complete restoring the data storage device.

An embodiment of the present invention provides another data storage device restoring method adapted to a data storage device. The data storage device includes an SSD controller, a power management circuit, a non-volatile memory, and a reset circuit. The data storage device restoring method comprises the power management circuit determining whether a normal signal from the SSD controller is received within a predetermined time; if not, the power management circuit pulling-down an enable port of the SSD controller to a low level through a restore port; and the power management circuit resupplying power to the data storage device.

In an embodiment of the present invention, after the step of the power management circuit pulling-down the enable port of the SSD controller to the low level through the restore port, the data storage device restoring method further comprises the SSD controller completing an execution of a read-only memory program within a first buffer time but the SSD controller failing to read a boot code within a second buffer time, so that the SSD controller staying in a ROM mode.

In an embodiment of the present invention, the data storage device is coupled to a host device. After the step of the SSD controller staying in the ROM mode, the data storage device restoring method further comprises the SSD controller downloading a debug program from the host device in the ROM mode; the SSD controller executing the debug program to generate an error message; the SSD controller uploading the error message to the host device; and the SSD controller downloading an upgrade program from the host device and executing the upgrade program to complete restoring the data storage device.

In the data storage device restoring methods provided by the embodiments of the present invention, a first embodiment is the action of performing power mask on the non-volatile memory, so that the SSD controller of the data storage device cannot load the boot code from the non-volatile memory or execute the boot code within a predetermined time. Thus, the SSD controller is forced to stay in the ROM mode and the data storage device restoring method of the present invention is performed on the data storage device. A second embodiment is that the power management circuit pulls-down the enable port of the data storage device to a low level by the restore port. Because the enable port is at the low level, the SSD controller only executes the ROM code during the stage of resupplying power to the data storage device without loading the boot code. Thus, the SSD controller is forced to stay in the ROM mode and the data storage device restoring method of the present invention is performed on the data storage device. In this way, the data storage device restoring process can be automatically performed without disassembling the data storage device or sending the data storage device to a service station, which significantly reduce the time and improve convenience of processing the restoration of the data storage device.

The above description is only an overview of the technical solution of the present invention. In order to understand the technical means of the present invention more clearly, it can be implemented according to the content of the specification. In order to make the above and other objects, features, and advantages of the present invention more comprehensible, embodiments are described below in detail with reference to the accompanying drawings, as follows.

DETAILED DESCRIPTION OF PREFERRED EMBODIMENTS

Figure 1:
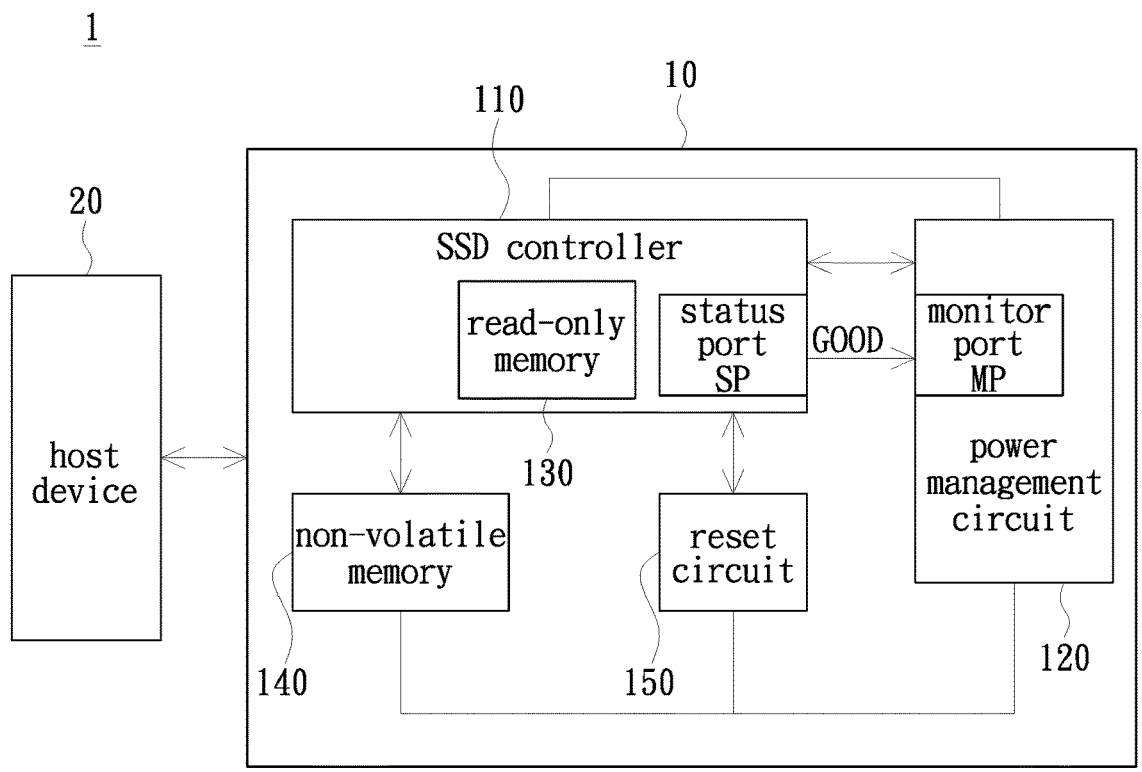
FIG. 1 is a schematic diagram of a system structure of a data storage device according to an embodiment of the invention.

A method of a data storage device entering a ROM mode and a method of a data storage device restoring data in a ROM mode which are provided in an embodiment of the present invention can be adapted to, for example, a portable data storage device such as a solid-state data storage device (SSD), or other electronic products using a non-volatile memory such as NAND Flash as a data storage device.

An initialization of a data storage device mainly includes two stages. The first stage is a system on chip (SoC) control circuit of the data storage device executing a read-only memory code (ROM code). The second stage is to load and execute a boot code for loading and executing a firmware. If the initialization is successfully completed, the data storage device enters a ready state. The data storage device restoring method provided in the embodiment of the present invention is mainly monitoring the initialization process of the data storage device. If the data storage device is successfully initialized and enters the ready state, the system on chip control circuit of the data storage device will send a normal signal to the power manager without activating a data storage device restoring process of the present invention. Conversely, if not, the data storage device restoring process of the present invention is activated.

The methods of the data storage device entering a ROM mode can be divided into two embodiments. A first embodiment is an action of performing a power mask on the non-volatile memory. The non-volatile memory is not working properly because the power is masked, which causes a SSD controller of the data storage device failing to load the boot code from the non-volatile memory or execute the boot code within a predetermined time. In this way, the SSD controller avoids a condition that the boot code or the firmware with problems is loaded which causes the data storage device failing to operate normally, thereby achieving an object of the present invention. The steps of the embodiment are as follows. First, the SSD controller commands a power management circuit to reset power. Next, the power management circuit supplies power to the SSD controller and allows the SSD controller to execute the ROM code. After that, the power management circuit supplies power to a reset circuit. Finally, the power management circuit supplies power to the non-volatile memory. Because the power management circuit does not supply power immediately to the non-volatile memory, the non-volatile memory cannot operate immediately, which makes the SSD controller failing to load the boot code or boot loader immediately from the non-volatile memory. Such that the SSD controller is forced to execute only the ROM code or stay in the ROM mode. Since the ROM code can be operated normally, the data storage device restoring method of the present invention can be performed on the data storage device at this moment.

A second embodiment is that a power management circuit pulls-down an enable port of a data storage device to a low level through a restore port. Then, all power supplied to the data storage device is reset. Then, the power supplied to the data storage device is resupplied. Because the enable port is at a low level, a system on chip control circuit only executes the ROM code during the stage of resupplying power to the data storage device and does not load the boot code or boot loader. At this moment, since the ROM code can be operated normally, the data storage device restoring method of the present invention can be performed on the data storage device in the ROM mode.

The first embodiment is explained first. Please refer to FIG. 1. FIG. 1 is a schematic diagram of a system structure of a data storage device according to an embodiment of the invention. A data storage device 10 can be connected to a host device 20 and process host commands, such as data read commands or data write commands, from the host device 20. The data storage device 10 mainly includes an SSD controller 110, a power management circuit 120, a non-volatile memory 140, and a reset circuit 150. The SSD controller 110 is provided with a read-only memory (ROM) 130 internally and has a status port SP. The power management circuit 120 has a monitor port MP. In addition, a power line of the SSD controller 110 can be coupled to a power management circuit 120. A signal line and a power line of the non-volatile memory 140 can be respectively coupled to the SSD controller 110 and the power management circuit 120. A signal line and a power line of the reset circuit 150 can be respectively coupled to the SSD controller 110 and the power management circuit 120. The SSD controller 110 mainly includes a central processing unit (CPU), a general-purpose input and output (GPIO) interface, a host communication interface, and a non-volatile memory communication interface. The read-only memory 130 stores a read-only memory program. The non-volatile memory 140, such as a flash memory, stores a boot code/a boot loader. The power management circuit 120 preferably performs data/signal transmissions with the SSD controller 110 through the GPIO interface. The status port SP and the monitor port MP can be built on the GPIO interface, or they can be independent data ports. It should be noted that the power management circuit 120 can be a type of integrated circuit or a type of assembling discrete components, or integrated into the SSD controller 110. Also, the reset circuit 150 can be a type of integrated circuit or a type of assembling discrete components, or integrated into the SSD controller 110.

Figure 2:
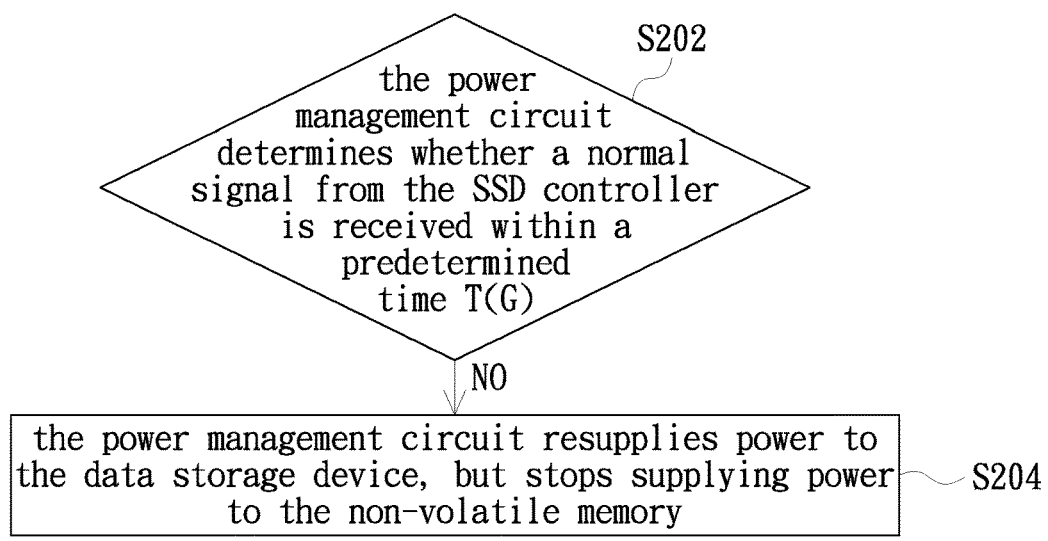
FIG. 2 is a schematic flow diagram of a method of a data storage device entering a ROM mode according to an embodiment of the invention.
Figure 3:
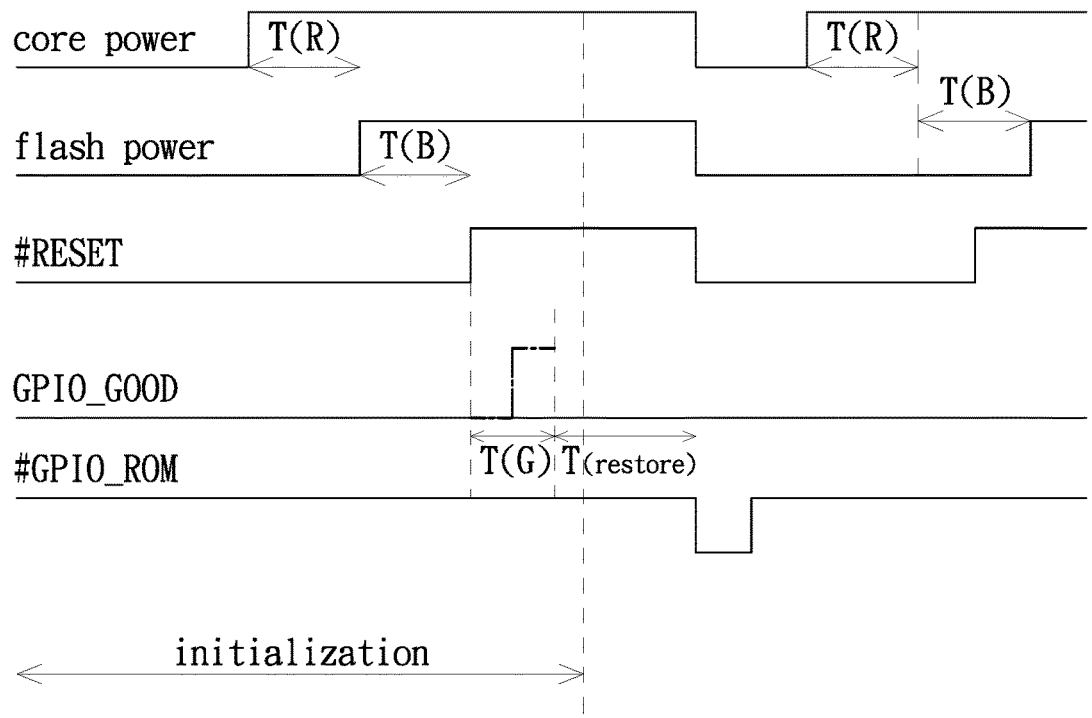
FIG. 3 is a schematic timing diagram of a data storage device entering a ROM mode according to an embodiment of the invention.

FIG. 2 is a schematic flow diagram of a method of the data storage device entering a ROM mode according to the embodiment of the invention. FIG. 3 is a schematic timing diagram of the data storage device entering the ROM mode according to the embodiment of the invention. In step S202, the power management circuit 120 determines whether a normal signal GOOD from the SSD controller 110 is received within a predetermined time T(G). The normal signal GOOD is a waveform of GPIO_GOOD (drawn by dot-and-dash line) shown in FIG. 3. It means that the SSD controller 110 can normally load and execute the boot code and can normally load and execute the firmware. The normal signal GOOD is, for example, a high-level signal. Furthermore, the SSD controller 110 can send the normal signal GOOD to the power management circuit 120 through the status port SP, and the power management circuit 120 can receive the normal signal GOOD through the monitor port MP. The monitor port MP and status port SP mentioned here use, for example, the GPIO interface.

As mentioned above, in the first stage of the initialization, the power management circuit 120 sequentially supplies power to the SSD controller 110 and the non-volatile memory 140 as shown by waveforms of core power and flash power in FIG. 3. There is a first buffer time T(R) between supplying power to the SSD controller 110 and supplying power to the non-volatile memory 140. The SSD controller 110 can preferably complete an execution of the ROM code within the first buffer time T(R). The SSD controller 110 preferably can complete an execution of the boot code/boot loader within the second buffer time T(B). Next, the power management circuit 120 supplies power to the reset circuit 150, as shown by a waveform of RESET. The SSD controller 110 preferably sends the normal signal GOOD to the power management circuit 120 within a predetermined time T(G).

In step S204, the power management circuit 120 resupplies power to the data storage device 10, but stops supplying power to the non-volatile memory 140. When the power management circuit 120 does not receive the normal signal GOOD from the SSD controller 110 within the predetermined time T(G), the powers supplied to the SSD controller 110, the non-volatile memory 140, and the reset circuit 150 can be stopped immediately or after a buffer time T(restore). Then, the powers are resupplied to the SSD controller 110 and the reset circuit 150. However, the power supplied to the non-volatile memory 140 is stopped, or power mask is performed on the non-volatile memory 140. The SSD controller 110 can preferably complete the execution of the ROM code within the first buffer time T(R) after the power is supplied to the SSD controller 110. Since no power is supplied to the non-volatile memory 140, the non-volatile memory 140 is inoperable. The SSD controller 110 cannot read the boot code/boot loader within the second buffer time T(B). Therefore, the SSD controller 110 stays in the ROM mode. In addition, the power management circuit 120 can also supply power to the non-volatile memory 140 after the second buffering time T(B), so that the SSD controller 110 stays in the ROM mode, but the non-volatile memory 140 can be operated normally.

Figure 4:
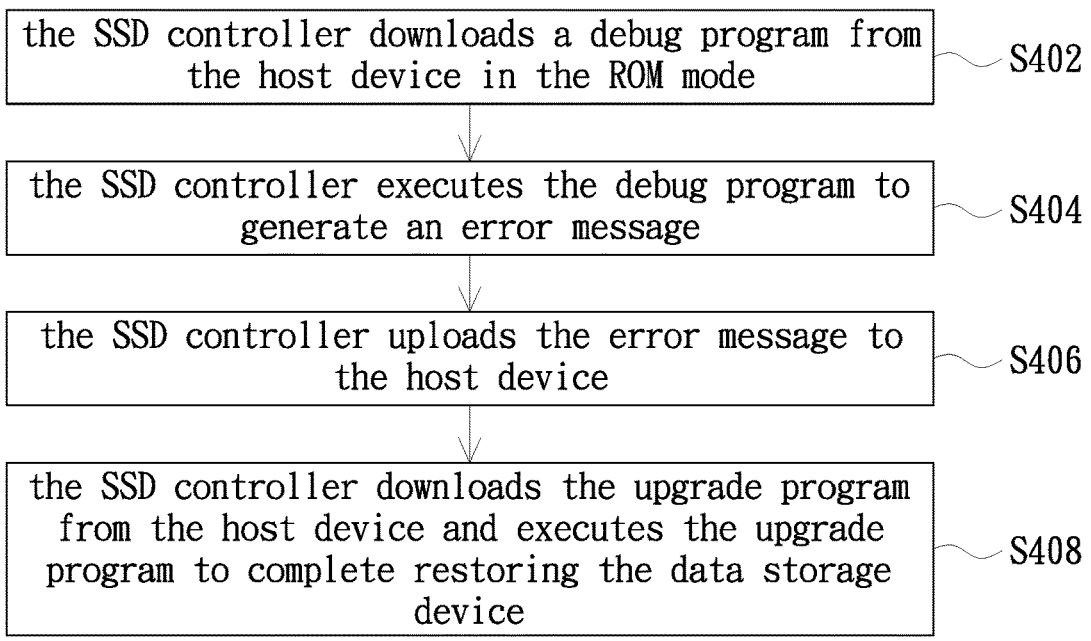
FIG. 4 is a schematic flow diagram of a method of a data storage device restoring data in a ROM mode according to an embodiment of the invention.

Please refer to FIG. 4. FIG. 4 is a schematic flow diagram of a method of a data storage device restoring data in a ROM mode according to an embodiment of the invention. In step S402, the SSD controller 110 downloads a debug program from the host device 20 in the ROM mode. In step S404, the SSD controller 110 executes the debug program to generate an error message. In step S406, the SSD controller 110 uploads the error message to the host device 20. The host device 20 analyzes the error message to generate an upgrade program after receiving the error message uploaded from the SSD controller 110. In step S408, the SSD controller 110 downloads the upgrade program from the host device 20 and executes the upgrade program to complete restoring the data storage device 10. The upgrade program is preferably an upgraded boot code/boot loader or a firmware. The SSD controller 110 preferably stores the upgraded boot code/boot loader or the firmware to the non-volatile memory 140. In this way, the data storage device restoring process can be automatically performed without disassembling the data storage device 10 or sending the data storage device 10 to a service station, which significantly reduce the time and improve convenience of processing the restoration of the data storage device.

Figure 5:
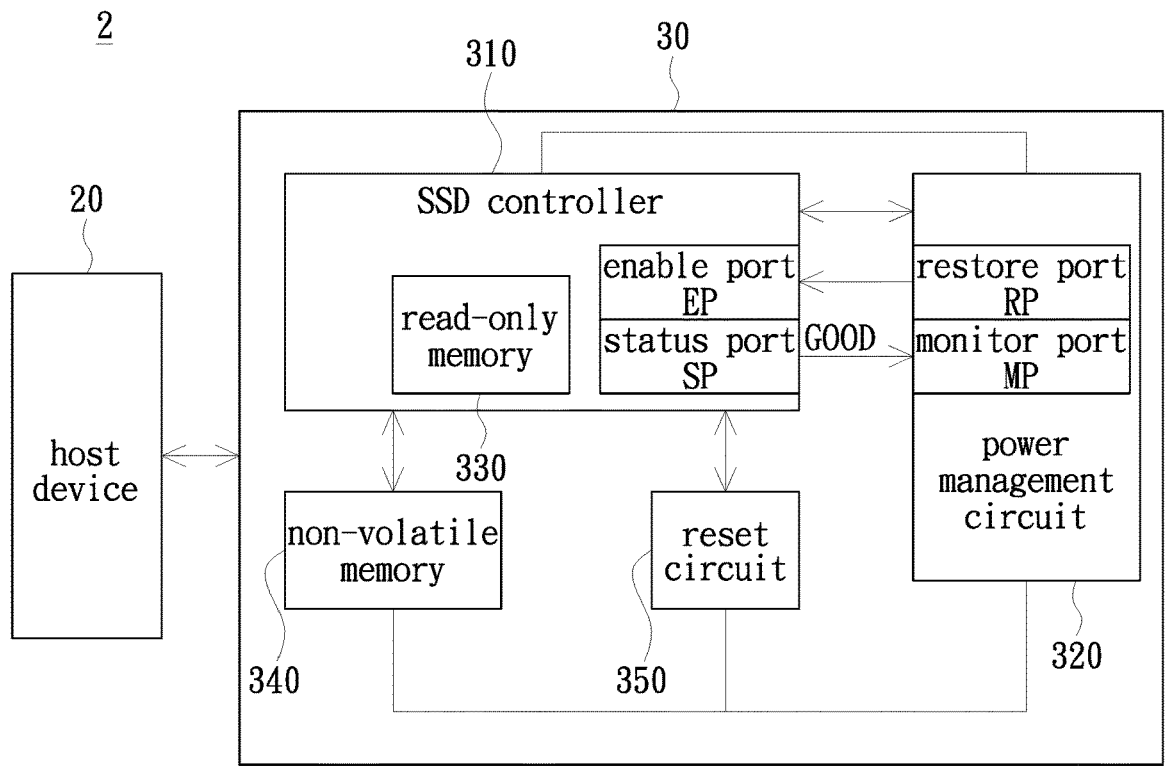
FIG. 5 is a schematic diagram of a system structure of a data storage device according to another embodiment of the invention.

The second embodiment is explained hereinafter. Please refer to FIG. 5. FIG. 5 is a schematic diagram of a system structure of a data storage device according to another embodiment of the invention. A data storage device 30 can be connected to a host device 20 and process host commands, such as data read commands or data write commands, from the host device 20. The data storage device 30 mainly includes an SSD controller 310, a power management circuit 320, a non-volatile memory 340, and a reset circuit 350. The SSD controller 310 is provided with a read-only memory (ROM) 330 internally and has a status port SP and an enable port EP. The power management circuit 320 has a monitor port MP and a restore port RP. It should be noted that, since the structure of the data storage device 30 is roughly the same as the structure of the data storage device 10, and the same parts have been described in the aforementioned embodiment, no redundant details to be given herein. The power management circuit 320 preferably performs a data transmission with the SSD controller 310 through a GPIO interface. The enable port EP and the restore port RP can be built on the GPIO interface, or they can be independent data ports.

Figure 6:
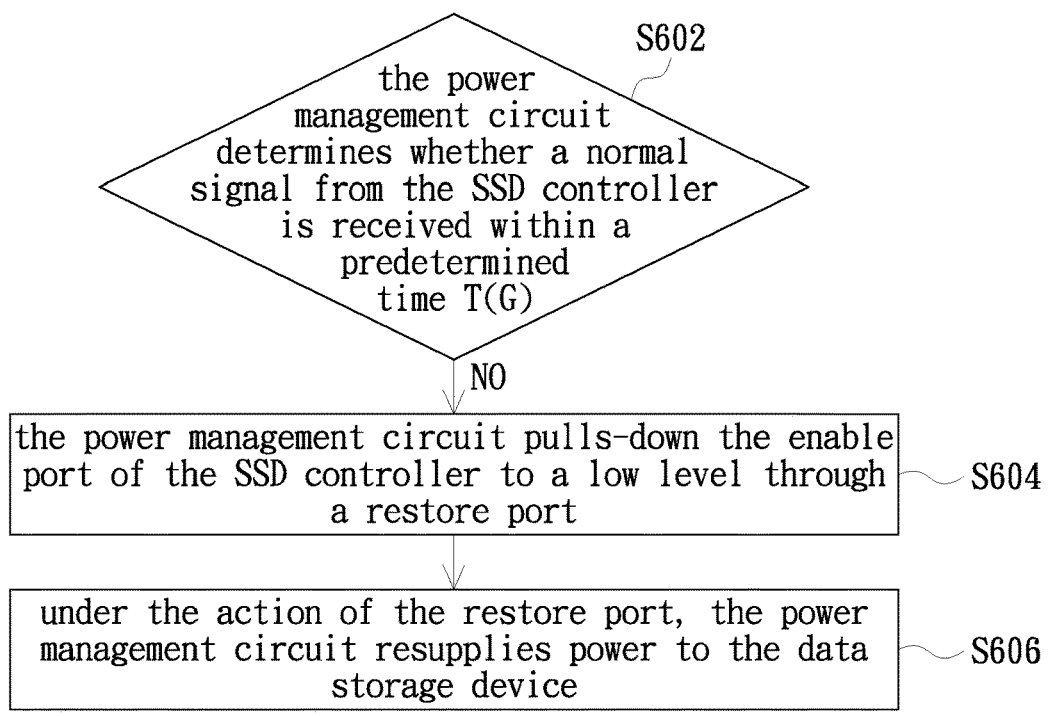
FIG. 6 is a schematic flow diagram of a method of a data storage device entering a ROM mode according to another embodiment of the invention.
Figure 7:
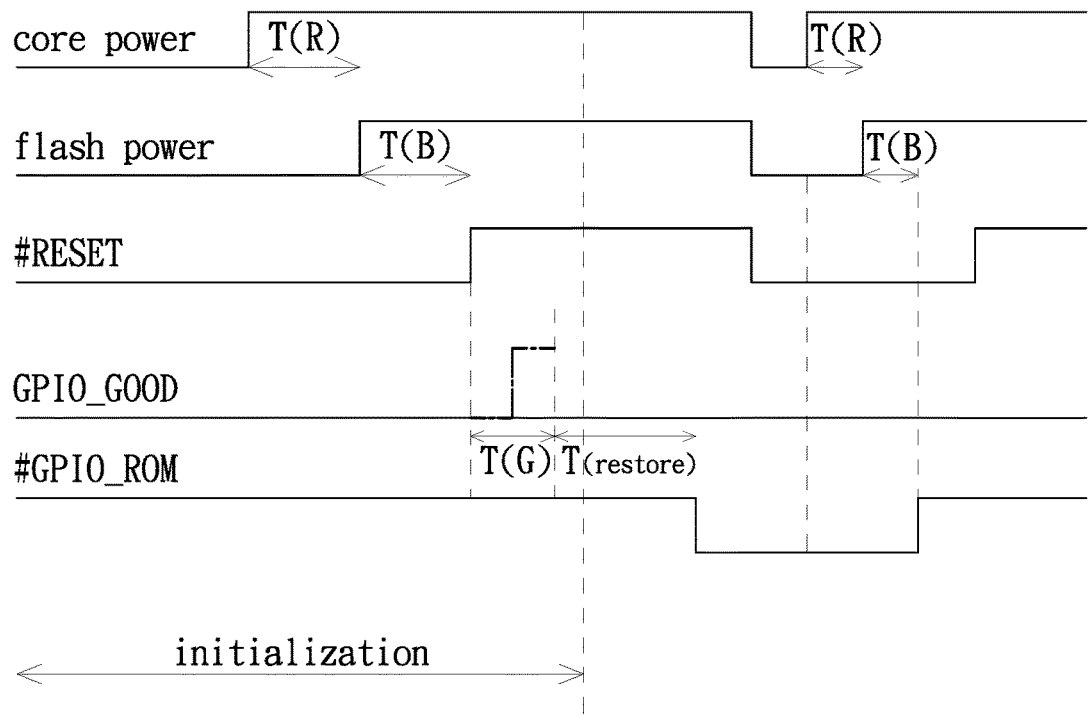
FIG. 7 is a schematic timing diagram of a data storage device entering a ROM mode according to another embodiment of the invention.

FIG. 6 is a schematic flow diagram of a method of a data storage device entering a ROM mode according to another embodiment of the invention. FIG. 7 is a schematic timing diagram of a data storage device entering a ROM mode according to another embodiment of the invention. In step S602, the power management circuit 320 determines whether a normal signal GOOD from the SSD controller 310 is received within a predetermined time T(G). The normal signal GOOD is a waveform of GPIO_GOOD (drawn by dot-and-dash line) shown in FIG. 7. It means that the SSD controller 310 can normally load and execute a boot code and can normally load and execute a firmware. Furthermore, the SSD controller 310 can send the normal signal GOOD to the power management circuit 320 through the status port SP, and the power management circuit 320 can receive the normal signal GOOD through the monitor port MP.

In step S604, the power management circuit 320 pulls-down the enable port EP of the SSD controller 310 to a low level through a restore port RP, as shown by a waveform of #GPIO_ROM in FIG. 7, which indicates that the SSD controller 310 only executes the ROM code, but does not loads the boot code/boot loader. Furthermore, when the power management circuit 320 does not receive the normal signal GOOD from the SSD controller 310 within the predetermined time T(G), the enable port EP of the SSD controller 310 can be pulled-down to the low level immediately or after a buffer time T(restore) through the restore port RP.

In step S606, under the action of the restore port RP, the power management circuit 320 resupplies power to the data storage device 10. As shown in FIG. 7, after the buffer time T(restore), the power management circuit 320 stops supplying power to the SSD controller 310, the non-volatile memory 340, and the reset circuit 350, and then resupplies power to the SSD controller 310, the non-volatile memory 340, and the reset circuit 350. After the power is supplied to the SSD controller 310, the SSD controller 310 can preferably complete an execution of the ROM code within a first buffer time T(R). Since the SSD controller 310 determines that the enable port EP is at the low level, the SSD controller 310 cannot read the boot code/boot loader within a second buffer time T(B) regardless of whether the power management circuit 320 supplies power to the non-volatile memory 340 or not. Therefore, the SSD controller 310 stays in the ROM mode. In other words, the SSD controller 310 only executes the ROM code and does not load the boot code/boot loader.

Figure 8:
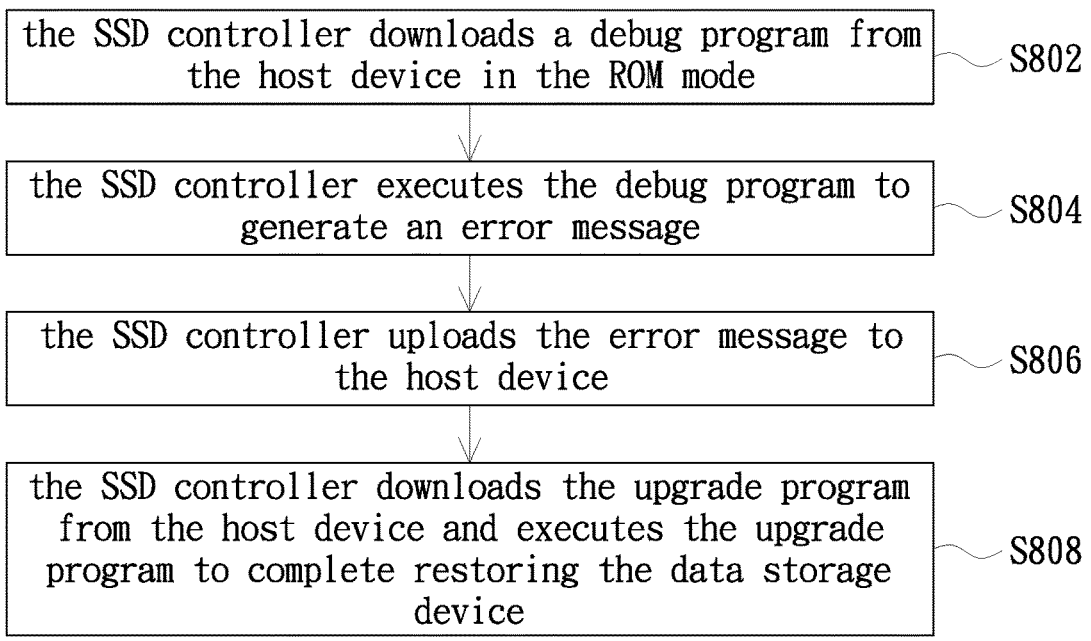
FIG. 8 is a schematic flow diagram of a method of a data storage device restoring data in a ROM mode according to another embodiment of the invention.

Please refer to FIG. 8. FIG. 8 is a schematic flow diagram of a method of a data storage device restoring data in a ROM mode according to another embodiment of the invention. In step S802, the SSD controller 310 downloads a debug program from a host device 20 in the ROM mode. In step S804, the SSD controller 310 executes the debug program to generate an error message. In step S806, the SSD controller 310 uploads the error message to the host device 20. The host device 20 analyzes the error message to generate an upgrade program after receiving the error message uploaded from the SSD controller 310. In step S808, the SSD controller 310 downloads the upgrade program from the host device 20 and executes the upgrade program to complete restoring the data storage device 30. The upgrade program is preferably an upgraded boot code/boot loader or a firmware. The SSD controller 310 preferably stores the upgraded boot code/boot loader or the firmware to the non-volatile memory 340. In this way, the data storage device restoring process can be automatically performed without disassembling the data storage device 30 or sending the data storage device 30 to a service station, which significantly reduce the time and improve convenience of processing the restoration of the data storage device.

In the data storage device restoring methods provided by the embodiments of the present invention, a first embodiment is the action of performing power mask on the non-volatile memory, so that the SSD controller of the data storage device cannot load the boot code from the non-volatile memory or execute the boot code within the predetermined time. Thus, the SSD controller is forced to stay in the ROM mode and the data storage device restoring method of the present invention is performed on the data storage device. A second embodiment is that the power management circuit pulls-down the enable port of the data storage device to a low level by the restore port. Because the enable port is at the low level, the SSD controller only executes the ROM code during the stage of resupplying power to the data storage device without loading the boot code. Thus, the SSD controller is forced to stay in the ROM mode and the data storage device restoring method of the present invention is performed on the data storage device. In this way, the data storage device restoring process can be automatically performed without disassembling the data storage device or sending the data storage device to a service station, which significantly reduce the time and improve convenience of processing the restoration of the data storage device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data storage device restoring method adapted to a data storage device, the data storage device including an SSD controller, a power management circuit, a non-volatile memory, and a reset circuit, wherein the data storage device restoring method comprises:
    the power management circuit determining whether a normal signal from the SSD controller is received within a predetermined time; and
    in response to the normal signal from the SSD controller not being received within the predetermined time, a reset signal being sent to the power management circuit by the reset circuit for the power management circuit to reset power accordingly and resupplies power to the data storage device without resupplying power to the non-volatile memory.

2. The data storage device restoring method according to claim 1, wherein after the step of the power management circuit resupplying power to the data storage device but stopping supplying power to the non-volatile memory, the data storage device restoring method further comprises:
    the SSD controller completing an execution of a read-only memory program within a first buffer time but the SSD controller failing to read a boot code within a second buffer time, so that the SSD controller staying in a ROM mode.

3. The data storage device restoring method according to claim 2, wherein the data storage device is coupled to a host device, and after the step of the SSD controller staying in the ROM mode, the data storage device restoring method further comprises:
    the SSD controller downloading a debug program from the host device in the ROM mode;
    the SSD controller executing the debug program to generate an error message;
    the SSD controller uploading the error message to the host device; and
    the SSD controller downloading an upgrade program from the host device and executing the upgrade program to complete restoring the data storage device.

4. A data storage device restoring method adapted to a data storage device, the data storage device including an SSD controller, a power management circuit, a non-volatile memory, and a reset circuit, wherein the data storage device restoring method comprises:
    the power management circuit determining whether a normal signal from the SSD controller is received within a predetermined time;
    in response to not receiving the normal signal from the SSD controller within the predetermined time, a reset signal being sent to the power management circuit by the reset circuit for the power management circuit to reset power accordingly and pulls-down an enable port of the SSD controller to a low level through a restore port; and
    the power management circuit resupplying power to the data storage device.

5. The data storage device restoring method according to claim 4, wherein after the step of the power management circuit pulling-down the enable port of the SSD controller to the low level through the restore port, the data storage device restoring method further comprises:
    the SSD controller completing an execution of a read-only memory program within a first buffer time but the SSD controller failing to read a boot code within a second buffer time, so that the SSD controller staying in a ROM mode.

6. The data storage device restoring method according to claim 5, wherein the data storage device is coupled to a host device, and after the step of the SSD controller staying in the ROM mode, the data storage device restoring method further comprises:

the SSD controller downloading a debug program from the host device in the ROM mode;
the SSD controller executing the debug program to generate an error message;
the SSD controller uploading the error message to the host device; and
the SSD controller downloading an upgrade program from the host device and executing the upgrade program to complete restoring the data storage device.

* * * * *